US008582164B2

(12) United States Patent
Elkady et al.

(10) Patent No.: US 8,582,164 B2
(45) Date of Patent: Nov. 12, 2013

(54) GENERATING MERGED DOCUMENTS

(75) Inventors: Osama Elkady, Foster City, CA (US); Tomoji Ashitani, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2205 days.

(21) Appl. No.: 10/733,102

(22) Filed: Dec. 10, 2003

(65) Prior Publication Data

US 2004/0120013 A1 Jun. 24, 2004

Related U.S. Application Data

(60) Provisional application No. 60/435,371, filed on Dec. 19, 2002.

(51) Int. Cl.
*G06K 15/00* (2006.01)
*G06K 15/02* (2006.01)
*G06F 3/12* (2006.01)

(52) U.S. Cl.
USPC .......................... 358/1.18; 358/1.2; 358/1.15

(58) Field of Classification Search
USPC .................. 358/1.18, 1.9, 1.16, 1.17, 1.13; 715/517, 513, 500, 506, 515; 382/137, 382/138, 139; 347/43; 709/230, 203, 246; 707/E17.006
See application file for complete search history.

(56) References Cited

U.S. PATENT DOCUMENTS

| 5,627,959 | A | 5/1997 | Brown et al. |
| 5,721,848 | A | 2/1998 | Joseph |
| 5,734,896 | A | 3/1998 | Rizvi et al. |
| 5,802,523 | A | 9/1998 | Jasuja et al. |
| 5,805,804 | A | 9/1998 | Laursen et al. |
| 5,826,085 | A | 10/1998 | Bennett et al. |
| 5,913,063 | A | 6/1999 | McGurrin et al. |
| 5,926,819 | A | 7/1999 | Doo et al. |
| 5,963,968 | A * | 10/1999 | Warmus et al. ............... 715/246 |
| 5,978,787 | A | 11/1999 | Wong et al. |
| 5,991,768 | A | 11/1999 | Sun et al. |
| 6,014,656 | A | 1/2000 | Hallmark et al. |
| 6,061,690 | A | 5/2000 | Nori et al. |
| 6,078,403 | A * | 6/2000 | Palmer ........................ 358/1.18 |
| 6,078,930 | A | 6/2000 | Lee et al. |
| 6,125,368 | A | 9/2000 | Bridge et al. |
| 6,163,858 | A | 12/2000 | Bodamer |

(Continued)

OTHER PUBLICATIONS

Oracle Corporation, "Summary of Subprograms," Oracle8*i* Supplied PL/SQL Packages References, Release 2 (8.1.6), Part No. A76936-01, 1996-2000, http://download-west.oracle.com/docs/cd/A87860_01/doc/appdev.817/a76936/utl_raw2.htm#1002422, data retrieved Mar. 21, 2004, pp. 1-19.

(Continued)

*Primary Examiner* — David K Moore
*Assistant Examiner* — Neil R McClean
(74) *Attorney, Agent, or Firm* — Hickman Palermo Truong Becker Bingham Wong LLP (57) ABSTRACT

A method and apparatus for generation of electronic documents, such as a merge utility, is disclosed. In an embodiment, the merge utility merges two types of documents at least one of which is first converted from a format that is not supported by an output device to one that is. In an embodiment, one document may contain information related to an overlay and the other may contain information related to a background. In an embodiment, the conversion is performed in a format that is supported by an output device.

30 Claims, 4 Drawing Sheets

(56) References Cited

U.S. PATENT DOCUMENTS

| | | | |
|---|---|---|---|
| 6,167,517 A | | 12/2000 | Gilchrist et al. |
| 6,173,313 B1 | | 1/2001 | Klots et al. |
| 6,199,034 B1 | | 3/2001 | Wical |
| 6,199,058 B1 | | 3/2001 | Wong et al. |
| 6,330,073 B1 | * | 12/2001 | Sciatto .................. 358/1.18 |
| 6,374,232 B1 | | 4/2002 | Dageville et al. |
| 6,529,904 B1 | | 3/2003 | Elsbernd et al. |
| 6,532,479 B2 | | 3/2003 | Souder et al. |
| 6,578,015 B1 | | 6/2003 | Haseltine et al. |
| 6,684,207 B1 | | 1/2004 | Greenfield et al. |
| 6,691,118 B1 | | 2/2004 | Gongwer et al. |
| 6,697,804 B1 | | 2/2004 | Elsbernd et al. |
| 6,708,186 B1 | | 3/2004 | Claborn et al. |
| 7,099,027 B1 | * | 8/2006 | Barry et al. .................. 358/1.15 |
| 7,202,972 B1 | * | 4/2007 | Schwier et al. ............... 358/1.9 |
| 2003/0191701 A1 | | 10/2003 | Haseltine et al. |

OTHER PUBLICATIONS

Oracle Corporation, "Key Integration Concepts," Oracle8*i* Integration Server Overview, Release 3 (8.1.7), Part No. A83729-01, 1996-2000, http://download-west.oracle.com/docs/cd/A87860_01/docs/ois.817/a83729/adois04.htm#1000647, data retrieved Mar. 21, 2004, pp. 1-18.

Oracle Corporation, "UTL_RAW Package," Oracle® Procedural Gateway and Tools for IBM MQSeries Installation and User's Guide, Release 9.2.0.1.0 for MS Windows, Part No. A96197-01, 2001, 2002, http://download-west.oracle.com/docs/html/A96197_01/ap_urpkg.htm—sthref980, data retrieved Mar. 21, 2004, pp. 1-11.

Oracle Corporation, "Summary of UTL_RAW Subprograms," Oracle9*i* Supplied PL/SQL Packages and Types Reference, Release 2 (9.2), Part No. A96612-01, 2000, 2002, http://download-west.com/docs/cd/B10501_01/appdev.920/a96612/u_raw2.htm#1002422, data retrieved Mar. 21, 2004, pp. 1-19.

Oracle Corporation, "Overview Page Template," 2004, http://otn.oracle.com/tech/blaf/specs/overviewPage_template.html?_template=/otn/content/print, data retrieved Mar. 21, 2004, pp. 1-4.

Oracle Corporation, "Privacy Statement Template," 2004, http://otn.oracle.com/tech/blaf/specs/privacy_Template.html?_template=/otn/content/print data retrieved Mar. 21, 2004, pp. 1-4.

Oracle Corporation, "Introduction to BLAF Page Templates," 2004, http://otn.oracle.com/tech/blaf/specs/page_template.html?_template=/otn/content/print, data retrieved Mar. 21, 2004, pp. 1-10.

Oracle Corporation, "Checklist Templates," 2004, http://otn.oracle.com/tech/blaf/specs/checklist_template.html?_template=/otn/content/print, data retrieved Mar. 21, 2004, pp. 1-9.

Oracle Corporation, "Notification Page Templates," 2004, http://otn.oracle.com/tech/blaf/specs/notification_template.html?_template=/otn/content/print, data retrieved Mar. 21, 2004, pp. 1-11.

Oracle Corporation, "Long Page and Overview Template," 2004, http://otn.oracle.com/tech/blaf/specs/longOvPage_template.html?_template=/otn/content/print, data retrieved Mar. 21, 2004, pp. 1-4.

Oracle Corporation, "OracleAS Web Cache How-to," 2004, http://otn.oracle.com/sample_code/tech/java/codesnippet/webcache/jesitemplate.htm?_template=/otn/content/,data retrieved Mar. 21, 2004, pp. 1-3.

Oracle Corporation, "Uses of Class, oracle.ifs.beans.Template," 2004, http://otn/oracle.com/prodcuts/ifs/javadoc/904_javadoc/oracle/ifs/beans/class-use/Template.html?_template=/, data retrieved Mar. 21, 2004, 1 page.

Bill Lankenau, Oracle Corporation, "Oracle9*i* Application Server Portal—Product Features," An Oracle White Paper, May 2001, pp. 1-57.

ScanSoft, "Bringing Paper Documents into the Information Age with ScanSoft's PaperPort® Pro Suite and Oracle9*i*FS," pp. 1-12.

Oracle Corporation, "Understanding the Match-Merge Processing Flow (continued), Design Considerations," http://otn.oracle.com/products/warehouse/training/owb_data_quality/html/module%205/05_01_7.htm?_templ, data retrieved Mar. 21, 2004, 1 page.

Oracle Corporation, "Oracle9*i*AS Daily Feature, Oracle9*i*AS Discoverer: Integration with Reports," 2004, http://otn.oracle.com/products/ias/daily/feb06.html?_template=/otn/content/print, data retrieved Mar. 21, 2004, pp. 1-2.

Frank Nimphius, Oracle Corporation, "Integration Oracle9*i*AS Reports in Oracle9*i*AS Forms," An Oracle White Paper, *Updated version for Forms 6i patch 5 and higher, covering Oracle9i Application Server integration and the new Forms Listener Servlet Architecture*, Sep. 2001, pp. 1-40.

Oracle Corporation, "How to Execute Reports Services from 9*i*DS," an Oracle 9*i* Reports Technical Note, Nov. 2002, 2004, http://otn.oracle.com/products/reports/htdocs/getstart/whitepapers/oc4j_ids/howToReportsServicesIds.htm?_te, data retrieved Mar. 21, 2004, pp. 1-4.

Oracle Corporation, "How to Create a Report Portlet Template," 2004, http://otn.oracle.com/products/reports/htdocs/getstart/whitepapers/how_to_portlet_template3.htm?_template=/, data retrieved Mar. 21, 2004, pp. 1-3.

Oracle Corporation, "Oracle9*i*AS Daily Feature, Oracle9*i*AS Reports Services: Advanced Graphing in Oracle9*i* Reports," 2004, http://otn.oracle.com/products/ias/daily/apr03.html?_template=/otn/content/print, data retrieved Mar. 21, 2004, 1 page.

Oracle Corporation, "Oracle9*i*DS Daily Feature, Oracle9*i* Reports—Advanced Graphing," 2004, http://otn.oracle.com/products/ias/daily/may09.html?_template=/otn/content/print, data retrieved Mar. 21, 2004, 1 page.

Oracle Corporation, "Oracle9*i*DS Daily Feature, Oracle Reports—Centralized Management," 2004, http://otn.oracle.com/products/ids/daily/jun20.html?_template=/otn/content/print, data retrieved Mar. 21, 2004, pp. 1-2.

Oracle Corporation, "Oracle9*i*DS Daily Feature, Oracle9*i* Reports—Distribution and Bursting," 2004, http://otn.oracle.com/products/ids/daily/may02.html?_template=/otn/content/print, data retrieved Mar. 21, 2004, 1 page.

Oracle Corporation, "Oracle9*i*AS Daily Feature, Oracle9*i*AS Services: Populating Portal Content Areas Using Reports Services," 2004, http://otn.oracle.com/products/ids/daily/nov08.html?_template=/otn/content/print, data retrieved Mar. 21, 2004, 1 page.

Oracle Corporation, "Oracle9*i*DS Daily Feature, Oracle9*i* Reports Software Development Kit," 2004, http://otn.oracle.com/products/ids/daily/aug01.html?_template=/otn/content/print, data retrieved Mar. 21, 2004, 1 page.

Oracle Corporation, "Oracle9*i*AS Daily Feature, Oracle9*i*AS Reports Services: Data from Any Source," 2004, http://otn.oracle.com/products/ias/daily/jun27.html?_template=/otn/content/print, data retrieved Mar. 21, 2004, 1 page.

Oracle Corporation, "Oracle9i Reports: Software Development Kit, Destination," 2004, http://otn.oracle.com/products/reports/apis/plugdestination/DEST_3.html?_template=/otn/content/print, data retrieved Mar. 21, 2004, pp. 1-3.

Oracle Corporation, "Oracle9*i*AS Daily Feature, Customizing Reports at Runtime using XML," 2004, http://otn.oracle.com/products/ids/daily/sep19.html?_template=/otn/content/print, data retrieved Mar. 21, 2004, 1 page.

Oracle Corporation, "New Feature in Oracle Reports Developer and Reports Server 6*i*," An Oracle Technical White Paper, Mar. 2000, pp. 1-13.

* cited by examiner

GENERATING MERGED DOCUMENTS

This application claims priority benefit of U.S. Provisional Patent Application, Ser. No. 60/435,371, filed Dec. 19, 2002, which is hereby incorporated by reference in its entirety.

FIELD OF THE INVENTION

The present invention generally relates to electronic documents, and more specifically, to generating electronic documents.

BACKGROUND OF THE INVENTION

With the advent of laser printing, many users desire the ability to overlay text data atop background image data. For example, users desire background images, such as company logos, watermarks, headers and footers with an overlay of text based data with character sets, such as data contained in financial and inventory reports, invoices, and checks.

A conventional technique for overlaying text onto background templates for reports is to hire consultants to implement a software solution for customizing all of a company's reports. To create these customized reports, the consultants manually convert all of the text reports to include background images, such as a company logo or watermark. Typically, for a suite of reports for a typical financial system, a team of consultants might need to customize as many as 3000 reports. For example, a customer might need to modify thousands files to simply add a company logo to company invoices, checks, and other reports. The modification would need to be to repeated every time a patch or upgrade is applied to the software. There are some third party solutions to assist customers that have customization requirements. However, third party solutions are often proprietary, may not be supported, may require additional licensing fees, and may add other expenses, such as the expense of hiring consultants that specialize in the third party solution. Some drawbacks to conventional techniques are that hiring consultants and customizing are expensive and time-consuming. Another drawback of conventional techniques is that when a new version of software is released, resources are needed to upgrade customized reports for the newer versions of the software. Yet another drawback to conventional techniques is that many customers choose to not upgrade their software because of the time and effort and expense required for reformatting customized reports.

Typically, reports are designed with matching column lengths for data and fixed width columns. A drawback to conventional techniques for reformatting customized reports is that formatting changes for reports must be done manually for each report. Furthermore, including a background image such as a company logo, watermark, header, or footer changes the formatting of the report. The manual formatting and the changes to the formatting add additional expenses and time to the process of generating documents.

Another conventional technique for overlaying text onto background templates includes purchasing customized stationery with logos, watermarks, background images, headers, and footers. For printing invoices or checks on high fidelity papers, customers have to use preprinted stationery or use a costly hardware solution that is proprietary. In order to print customized reports, invoices and checks, customers manually feed the customized stationary into a printer. A drawback to customized stationary is that end users need to arrange the position of the report to be printed on the customized stationery by changing characteristics such as margins, pitches, and spaces between lines for every printer. Another drawback to customized stationary is that it requires knowledge of printer control commands. Often, the printer control commands vary among printers. In addition, the report has to be reprinted every time a positional attribute is changed so that the report fits in the correct position on the stationery. Furthermore, creating customized stationary requires using specialized printing materials to print invoices, reports, and checks. Another drawback to customized stationary is that it is very expensive.

Another conventional technique for overlaying text onto background templates is to implement a hardware solution. Hardware solutions typically send escape sequences for layered data and images. A drawback to hardware solution is that hardware solutions typically draw layers one at a time, and the hardware solutions are often report-specific, printer-specific, and hardware-specific. For example, printing different types of customized reports requires different custom hardware solutions. Thus, invoices would require one custom hardware solution, and checks would require another custom hardware solution. Furthermore, each hardware solution may also require a proprietary printer format.

The present inventors have recognized the above problems and concluded that it is desirable to provide an improved mechanism for overlaying text onto background templates.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

A method and apparatus for merging documents is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present method and apparatus for merging documents provides several features that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification. In the respective descriptions of each of FIGS. 1 and 2, all of the components are first listed by name and label number, and then afterwards described in greater detail in later paragraphs.

Operational Overview

In an embodiment, a mechanism is provided for overlaying text, graphics, or other items onto background templates in a format that is independent of various printing architectures. In an embodiment the mechanism includes a merge utility for generating electronic documents. In an embodiment, the user may generate output from an arbitrary textual, graphical, or other input coming from any program and can merge the generated output with a background template document.

For example, a merge utility conversion engine may convert an overlay input data file into a Standard Printing and Imaging Format (SPIF), such as a Page Description Language (PDL), a file formatted in the Printer Control Language (PCL) defined by the Hewlett-Packard Company, or a file formatted in a similar language by any other supplier such as Epson or Cannon, for example. An example of a PDL is PostSript. Thus, in this specification, the terms SPIF and PDL are not limited to any particular set of printer commands, but include similar page description languages.

According to an embodiment, the merge and print utility system reads a background template input data file. The background template input data file contains information for creating a background for a document, such as a form for a report. Conversion inputs are sent to an application for providing overlay data, which will be referred to as an overlay data authoring application. The overlay data is data for adding text, graphics, or other items to the background associated with the background template input data. For example, the overlay data may be a company logo, watermark, a color pattern for the page, a letterhead, a family shield, and/or other item that is later added to the background template input data. The conversion inputs are processed at the text overlay data authoring application.

At runtime, once the conversion inputs are read, a merge utility of the merge and print utility system merges the input information to merge the pages of a document or an overlay and a background into a single document (which may be referred to as a "merged document"). In an embodiment, the merged document can be used as a master template for all printed reports. For example, master templates can be re-used for corresponding invoices and checks based on a particular report. Alternatively, the report may be a form having all entries filled-in, and is not reusable as a template. According to an embodiment, the merge utility processes the converted overlay data and background template data file inputs and merges the input data into a single SPIF, such as a PDL PostScript file.

In an embodiment, a merge utility receives a merge document conversion request for document information that will define a particular output document. The document information may be received in a variety of formats, with each format having a set of commands that define how the overlay data and background template data objects are to be printed for each page of the document. For example, the background template data may be in the form of a text file produced by a particular authoring program, such as Oracle Reports file. The overlay data may be in the form of a file produced by a particular application, such as a Microsoft Word file. Alternatively, the text overlay and background template data document information may be files formatted in a PDL format.

The merge and print utility system is not limited to a particular printing device, on a particular command, or based on a particular document type. The merge and print utility generates output that is not limited to any particular printer format file. For explanation purposes only, certain embodiments shall be described in terms of text or other overlay data and background template input data merged in a merge and print utility, which generates output using a standard printer file format, such as the PDL PostScript file format.

A Merge and Print Utility System

Figure 1:
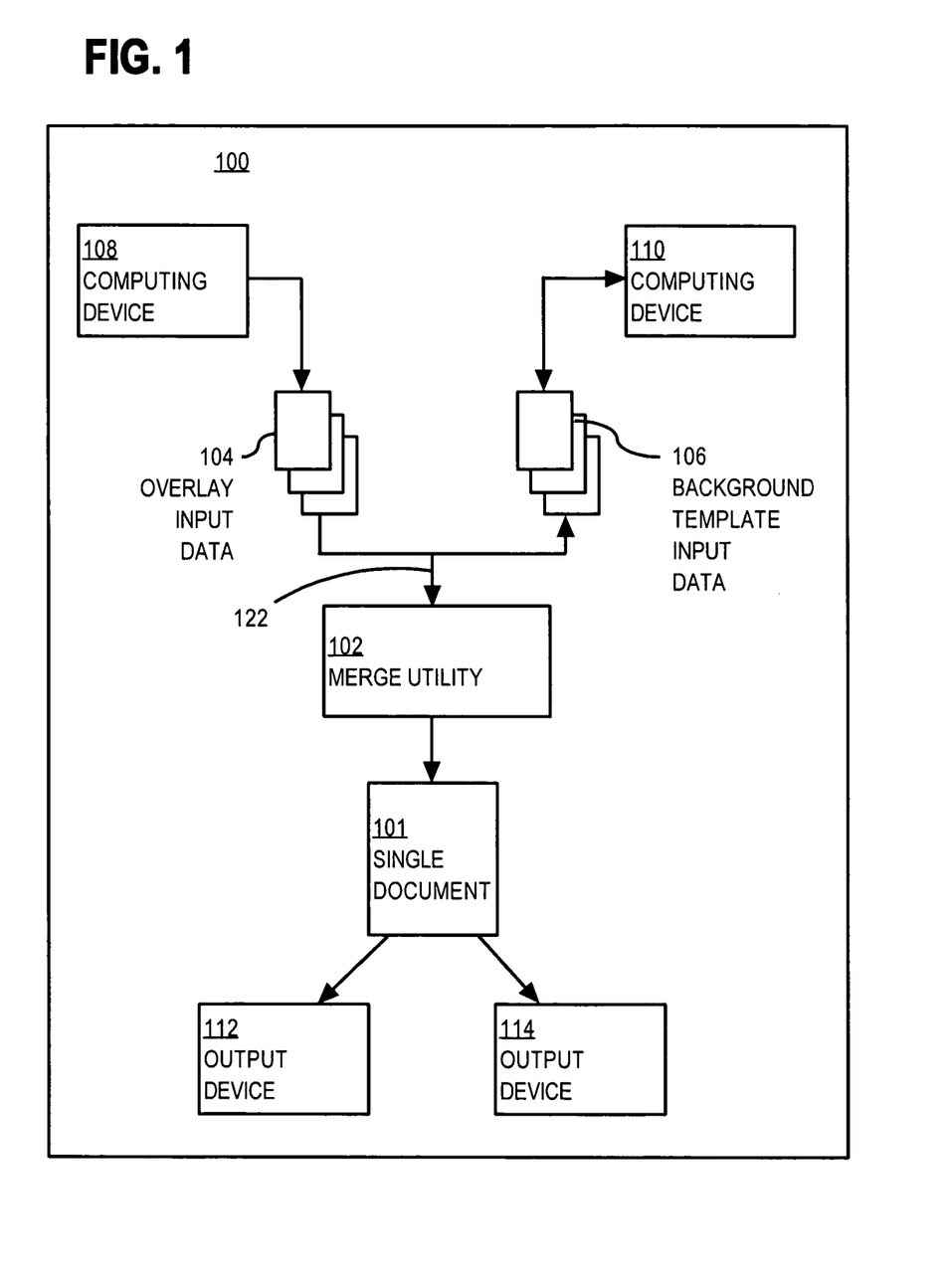
FIG. 1 is a block diagram that depicts a high level overview of a merge and print utility system for the generation of an electronic document, according to an embodiment of the invention.

FIG. 1 is a block diagram of a merge and print utility system 100, according to an embodiment of the invention. Merge and print utility system 100 includes a single document 101 produced by merge utility 102, overlay input data 104, background template input data 106, one or more computing devices 108 and 110, one or more output devices 112 and 114, and network connection 122. In alternative embodiments, merge and print utility system 100 may not have all of the components listed above or may have other components in addition to or instead of those listed above. The components listed above are discussed in the paragraphs that follow in their numerical order.

Single document 101 is single document formed from a merger of two documents that may be of different types. Single document 101 may be in a format, such as SPIF, that can easily be handled by a variety of output devices (a merge format).

The merge utility 102 may be referred to as a merge and print utility and may be a computer system with one or more software components or processes operating in a computer system. Merge utility 102 merges two or more documents into single document 101. In an embodiment, the documents being merged are either already in or are placed into the format of single document 101 prior to merger. Merge utility 102 may include a conversion utility to convert documents from an original format into the merge format. Additionally, merge utility 102 may be capable of (1) inspecting a document, (2) determining the application that created the document, and/or (3) sending one or more instructions to the application that created the document to create a version of the original document that is in the merge format.

Overlay input data 104 and background template input data 106 represent different types of document data. Overlay input data 104 and background template input data 106 are types of data that a user desires to overlay one on top of the other, and may refer to either or both the versions or merge format versions of the overlay input data 104 and background template input data 106. Overlay input data 104 and background template input data 106, once in the merge format, are converted by merge utility 102 into single document 101. Overlay input data 104 is input data related to an overlay, which may be textual or graphical in nature, for example. Some examples of overlay input data 104 is data related to a logo, watermark, or background color pattern. Background template input data 106 may be textual or graphical background data, such as a report or form, which may be generated from another program and in a different format than overlay input data 104. In an embodiment, overlay input data 104 is initially sent to merge utility 102 in its original format, and later sent to merge utility 102 in the merge format. In an embodiment, background template input data 106 is sent to merge utility 102 only in its original format, and later converted by merge utility 102 in the merge format. However, in alternative embodiments, overlay input data 104 and background template input data 106 may be replaced with any two types of data, and may both be sent to merge utility 102 in their, respective, original formats, merged formats, or both. Although only in the examples given in the specification only two documents are merged, in alternative embodiments any number of documents of any number of different types could be merged.

Computing devices 108 and 110 may each be a workstation, a personal computer, or other device that can generate a document. Computing devices 108 and 110 may be two different devices, different applications running on the same device, or the same application and device. Computing devices 108 and 110 generate original background and overlay document, which are used to generate overlay input data 104 and background template input data 106, respectively. Computing devices 108 and/or 110 may send overlay input data 104 and background template input data 106 as original documents to merge utility 102, which converts the original documents into converted versions of overlay input data 104 and background template input data 106, respectively. In this specification the terms "converted" and "generated" may be interchanged with one another. Alternatively computing devices 108 and/or 110 receive instructions from merge utility 102 to use original documents created by computing devices 108 and/or 110 to generate converted versions of overlay input data 104 and/or background template input data 106. For example, computing device 108 may receive instructions to convert an original overlay document into a converted version of overlay input data 104, while computing device 110 may send an original background document to merge utility 102 in the merge format, which in turn generates a converted version of background template input data 106 in the merge format.

Output devices 112 and 114 are resources or output devices that can be used to print the pages of a document or store a page of a document in a file, for example. Either of both of output devices 112 and 114 may print single document 101. Output devices 112 and 114 may be different types of devices that handle different output formats, such as two different types of printers. A variety of output devices such as printing devices and computer systems can be used in printing or storing the pages of a document. Thus, the invention is not limited to any particular type of printing or other output device. For example, output devices 112 and 114 may be a combination of color printers, black and white printers, plotters, copiers, and other devices that are used for printing pages of a document.

Network connection 122 may be a bus or a computer-readable medium, which may be any one of or any combination of optical, magnetic electrical, mechanical, or acoustic systems for transferring data or signals. Overlay input data 104 and background template input data 106 may be sent to the merge utility 102 and single document 101 may be sent to output device 112 and/or 114 using a variety of methods. For example, overlay input data 104 and background template input data 106 may be sent to the merge utility 102 and single document 101 may be sent to output device 112 and/or 114 via a network connection 122. Alternatively, overlay input data 104 and background template input data 106 may be stored in a database, a mass storage device, or a computer-readable medium, and then loaded onto merge utility 102 separately from the database, the mass storage device, or the computer-readable medium, for example. In this specification, a database may be a collection of data and software programs to manipulate the data, for example. The database may maintain data through variety of modification operations, such as insert, update, and delete operations.

Merge Utility

Figure 2:
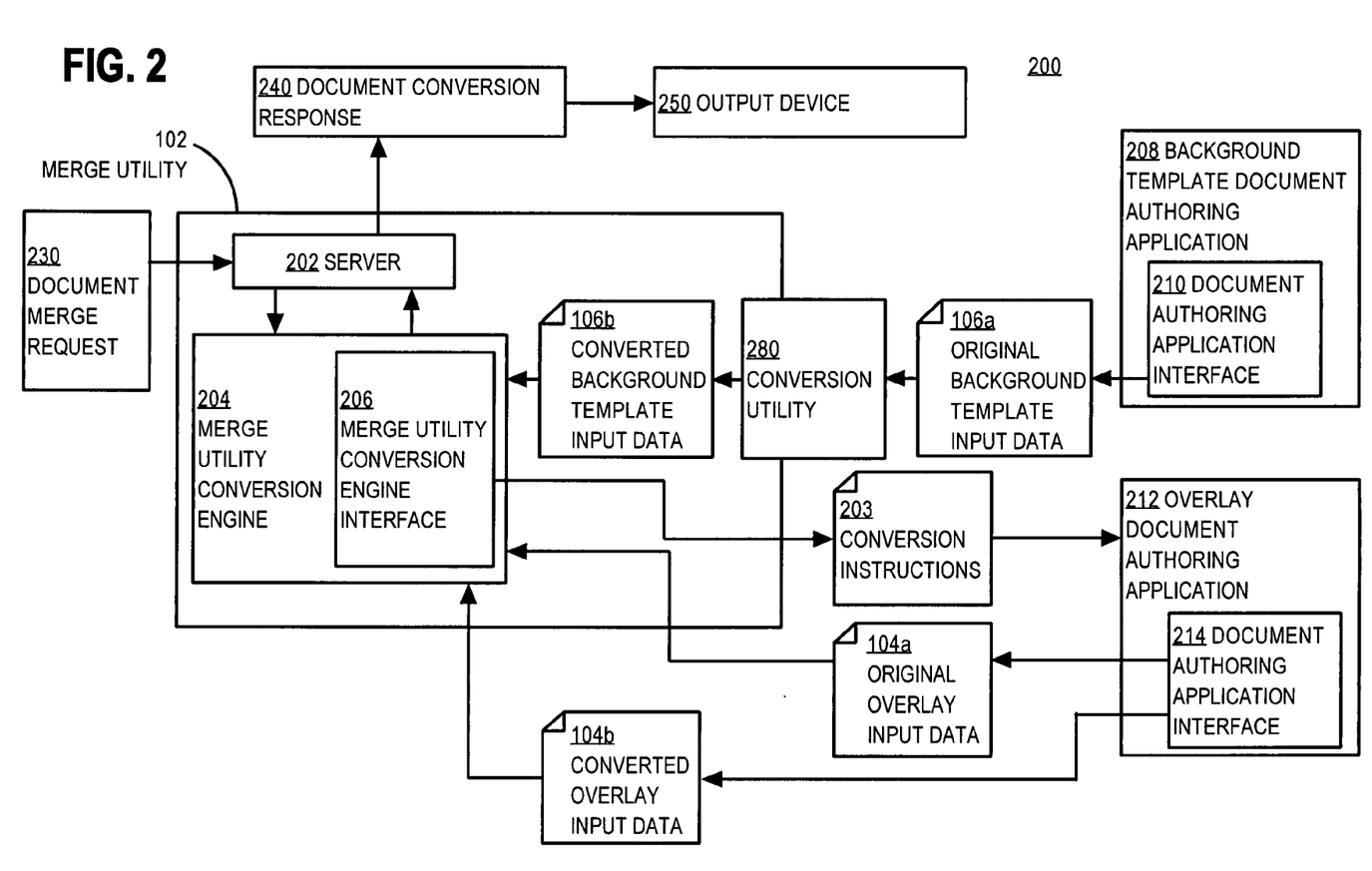
FIG. 2 is a block diagram that depicts a system that includes a merge utility, which may also be used in the merge and print utility system of FIG. 1, according to an embodiment of the invention.

FIG. 2 depicts system 200 having merge utility 102, which may include server 202, produce conversion instructions 203, and include merge utility conversion engine 204, which in turn may include merge utility conversion engine interface 206. The merge utility 102 interacts with original overlay input data 104a, converted overlay input data 104b, original background template input data 106a, and converted background template input data 106b, and document authoring applications, such as background template document authoring application 208 and overlay document authoring application 212. According to an embodiment, background template document authoring application 208 and overlay document authoring application 212 include a subset of the functionality of the application used to create the original documents, and also include document authoring application interfaces 210 and 214, respectively. System 200 also includes document merge request 230, document conversion response 240, output device 250, and conversion utility 280. In alternative embodiments, system 200 may not have all of the components listed above or may have other components in addition to or instead of those listed above. The components of system 200 are described in the order of the flow of information starting from inputs document merge request 230, background template document authoring application 208, and overlay document authoring application 212 and ending with output device 250.

Document merge request 230 may be a request to merge a document with a background before printing or storing. According to an embodiment, document merge request 230 may be a request to merge or a request to both merge and print documents (a merge and print conversion request) and may comprise document conversion parameters, or other document information such as document location information, or the name of the document authoring application that created the original document. In an embodiment, the merge request 230 includes information about an editor and conversion mechanism, the environment for the conversion of the original document to a PDL format or other SPIF.

Regarding background template document authoring application 208, original background template input data 106a and converted background template input data 106b are background template input data 106 in the format in which it was originally created and in the merge format to which it is later converted, respectively. Background template authoring application 208 may run on computing device 110, and in an embodiment, produces original background template data document (e.g., background template input data 106A) in an original format that later becomes the background of the merged document. Original background template input data 106a may be generated, at background template document authoring application 208, using a widely available WYSI-WIG document authoring application, such as Microsoft PowerPoint, Microsoft Word, or Microsoft Excel. Background template document authoring application interface 210 passes the background template input data 106a from background template authoring application 208 to conversion utility 280.

Conversion utility 280 converts the background template (original background template input data 106a) from an original format to converted background template input data 106b in the merge format supported by output device 250. The merge format may be in the same format as the merged document (single document 101), except that the background and overlay have not yet been merged. Alternatively, the merge format may be a different format than the merged document. Conversion utility 280 may be incorporated within merge utility 102 or may be a separate module. Conversion utility 280 may be a widely available driver, such as Xpdf pdftops for Microsoft software and an Adobe generic printer driver utility to generate a SPIF file, such as a PDL PostScript file.

Regarding overlay document authoring application 212, original overlay input data 104a and converted overlay input data 104b are background template input data 104 in the format in which it was originally created and in the merge format to which it is later converted, respectively. Overlay document authoring application 212 may run on computing device 108, and produces overlay data documents (e.g., overlay input data 104) that govern how the overlay document is overlayed on the background. In an embodiment, overlay document authoring application 212 produces overlay input data 104 in both an original and merge format, as original overlay input data 104a and converted overlay input data 104b. In an embodiment, overlay document authoring application interface 214 facilitates providing overlay input data 104b to merge utility 102 in a format that merge utility 102 can handle.

Specifically, in an embodiment, overlay document authoring application interface 214 receives instructions, based on merge request 230, that are executed by overlay document authoring application 212 for converting original overlay input data 104a from an original to the merge format. Conversion instructions 203 are one or more instructions received by overlay document authoring application 212 that cause overlay document authoring application 212 to generate converted overlay input data 104b.

In an embodiment, merge utility 102 may be a merge and print utility for producing a merged SPIF document from a converted background template input data document 106b (from background template document authoring application 208) and overlay input data 104b (from overlay document authoring application 212) based on document merge request 230. According to an embodiment, merge utility 102 receives document merge request 230, retrieves a background template data document (e.g., background template input data 106b) and a text overlay data document (e.g., overlay input data 104b) and produces a merged SPIF document (e.g., single document 101). Merge utility 102 may store the merged SPIF document as a template for later use. Merge utility 102 replies to the document merge request 230 by sending single document 101 as a document conversion response. The SPIF document, single document 101, produced by merge utility 102 preserves the visual presentation properties or virtually all of the visual presentation properties of the original overlay document (produced by overlay document authoring application 212) and background template data document (produced by background template document authoring application 208), as characterized by the document authoring application used to create the original document (overlay document authoring application 212).

Within merge utility 102, server 202 processes document conversion requests 230 for merge utility conversion engine 204 and processes the output of merge utility conversion engine 204 as conversion response 240. Server 202 is configured to receive and send document conversion requests and responses to the merge utility conversion engine 204. In an embodiment server 202 may be a separate unit than merge utility 102 rather than being incorporated within merge utility 102. At merge utility 102, server 202 receives document merge request 230. Server 202 passes the document merge request 230 to the merge utility conversion engine 204.

Within merge utility 102, merge utility conversion engine 204 compiles document conversion instructions 203 that dictate how the document conversion is to be performed based on document merge request 230 from server 202. In other words, merge utility conversion engine 204 generates conversion instructions 203 based on document merge request 230. According to an embodiment of the invention, the conversion instructions 203 may include information concerning the document authoring application that created the original document. Merge utility conversion engine 204 performs the actual merger of overlay input data 104 and background template input data 106 after they have been converted to a format appropriate for performing the merger, such as a PDL PostScript, another SPIF or another print-ready or merge format. The merged document may comprise a single file or document (e.g., single document 101) that retains the visual properties of the background template data with an overlay of the text overlay data.

In an embodiment, merge utility conversion engine 204 may include conversion utility 280 to convert documents from an original format into the merge format. Additionally, merge utility conversion engine 204 may be capable of (1) inspecting an original overlay document in its original format, such as original overlay input data 104a, (2) determining the application that created the document (e.g., overlay document authoring application 212), (3) sending one or more instructions, as conversion instructions 203, to overlay document authoring application 212 to create converted overlay input data 104b that is in the merge format, and/or (4) converting the merge format versions of overlay input data 104 and background template input data 106 into singe document 101. In an embodiment, overlay document authoring application 212 and overlay input data 104 may be an MS Word application and an MS Word document, and merge utility conversion engine 204 may generate conversion instructions 203 that causes a MS Word application to print an MS Word document into a postscript file.

Also within merge utility 102, merge utility conversion engine interface 206 acts as an interface between merge utility conversion engine 204 and text overlay authoring application 212. Merge utility conversion engine interface 206 also acts as an interface between merge utility conversion engine 204 and conversion utility 280. Merge utility conversion engine interface 206 calls overlay document authoring application interface 214, and passes it the conversion instructions 203 compiled by merge utility conversion engine 204, for processing by overlay authoring application 212. Documents from text overlay authoring application 212 and conversion utility 280 may be received by merge utility conversion engine 204 via merge utility conversion engine interface 206. Instructions related to sending and/or converting the format of background template input data 106 may be sent from merge utility conversion engine 204, via merge utility conversion engine interface 206, to background template document authoring application interface 210.

Response 240 is the merged document produced by merge utility 102, which may be single document 101. Response 240 is sent by server 202 to output device 250 for printing, for example. Output device 250 may be the same as output devices 112 or 114.

Method of Producing a Merged Document

Figure 3:
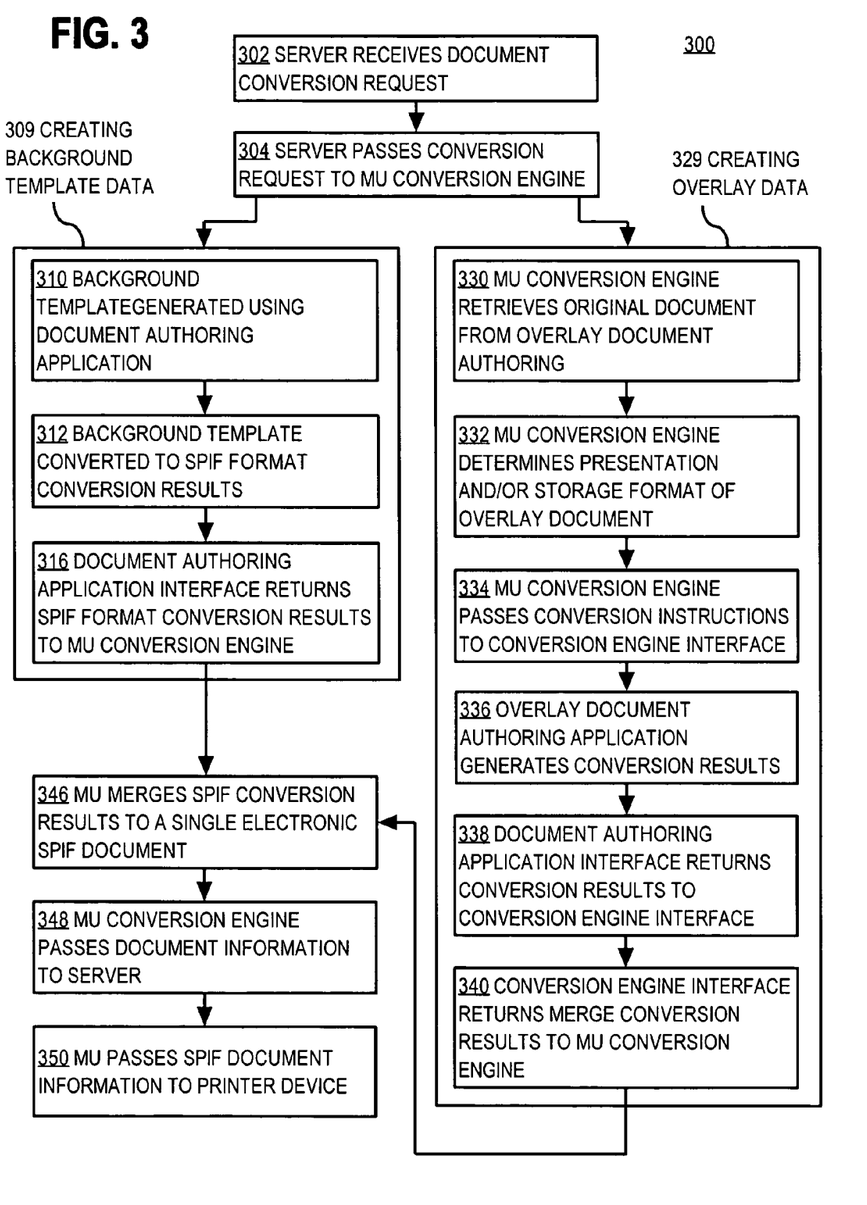
FIG. 3 is a flow diagram that depicts a method of operating the merge and print utility system of FIG. 1, according to an embodiment.

FIG. 3 is a flowchart illustrating a method 300 of producing a merge document from electronically stored original documents, in accordance with an embodiment of the invention.

At step 302, server 202 receives document merge request 230. In FIG. 2, merge utility is abbreviated as MU. At step 304, document merge request 230 is passed to merge utility conversion engine 204 for processing. From step 304, method 300 proceeds to steps 309 and 329, which may be performed in any order with respect to each other.

At step 309, background template data (e.g., converted background template input data 106b) is created via a number of sub-steps. At sub-step 310 a background template data document is generated (e.g., original background template input data 106a) by background template document authoring application 208. Sub-step 310 may include generating original background template input data 106a using a widely available WYSIWIG document authoring application, such as Microsoft PowerPoint, Microsoft Word, or Microsoft Excel.

At sub-step 312 the original background template data input data 106a is converted to a SPIF file by conversion utility 280 as converted background template input data 106b (which may include executing a widely available driver, such as Xpdf pdftops for Microsoft software and an Adobe generic printer driver utility to generate a SPIF file, such as a PDL PostScript file). According to an embodiment, at sub-step 312 an Xpdf utility may be run on the client side where the background template data document authoring application 208 resides or on the server side where a server side command is invoked to convert the original background template data document to a SPIF file. According to an embodiment, control tags may be added to the merge converted SPIF file to define the merge format. Control tags provide document format and content definitions such as header definition, function definitions, fonts, page contents background file data for the resultant merged file, and document structuring conventions.

At sub-step 316, the merge utility conversion engine interface 206 returns the SPIF conversion results (converted background template input data 106b) to the merge utility conversion engine 204 for processing and merging with text overlay data. In an embodiment, sub-step 316 is the last step in step 309. In alternative embodiments, step 309 may not have all of the sub-steps listed above or may have other sub-steps in addition to or instead the sub-steps listed above.

At step 329, overlay data (e.g., overlay input data 104) is created via a number of sub-steps. At sub-step 330, the merge utility 102 retrieves the original overlay document (e.g., original overlay input data 104a) from the original document authoring application (e.g., overlay document authoring application 212), which is in an original format created by overlay document authoring application 212. Merge utility conversion engine 204 extracts information, from merge request 230 and/or from original overlay input data 104a, that may be used later to convert original overlay input data 104a into the merge format. In an embodiment of the invention, the merge request 230 includes information about an editor and conversion mechanism, the environment for the conversion of the original document to a PDL format document. Original overlay input data 104a may be created using any editor.

At sub-step 332, the merge utility conversion engine 204 determines the electronic storage format and/or a presentation format related to original overlay data input 104a. According to an embodiment, the original overlay input data 104a may be stored in a database, a mass storage device, or a computer-readable medium. According to an embodiment, the storage format for original overlay input data 104a may be in a graphic or text format, for example, such as a report generated by a report generator. For example, the report generator may be Hyperion Enterprise, SAP, or Oracle Reports, or some other component of the Oracle family of products. According to an embodiment, the storage format of original overlay input data 104a may be of another type, such as Adobe Photoshop or Adobe Acrobat, or some other component of the Adobe family of products. In an embodiment of the invention, the presentation format and/or storage format of the original document may be indicated within merge request 230 or an element of the merge utility conversion engine 204, for example.

At sub-step 334, based on the information extracted from conversion request 204 and/or the document type of original overlay input data 104a, the merge utility conversion engine 204 generates conversion instruction, and passes the conversion instructions to merge utility conversion engine interface 206. The conversion instructions may comprise a reference containing an image file name, attributes of the original overlay input data 104a, such as the paper size of the document, and the margin size of the document, and conversion mechanism information. Conversion mechanism information may include, for example, information for conversion of the original document to a merge SPIF, such as PDL PostScript. According to an embodiment, the original documents may be converted to PostScript format either by pdftops command by Xpdf or with an Adobe Generic PostScript printer driver.

At sub-step 336, overlay document authoring application 112 generates conversion results, which may be converted overlay input data 104b, from the original overlay documents (original overlay input data 104a). In other words, overlay document authoring application 112 converts overlay input data 104 from an original format to a merge format. The generated conversion results preserve the visual presentation properties of the original overlay input data 104a. At sub-step 338, document authoring application interface 214 returns the conversion results, as converted overlay input data 104b, to the merge utility conversion engine interface 206. In an embodiment, sub-step 338 is the last step in step 329. In alternative embodiments, step 329 may not have all of the sub-steps listed above or may have other sub-steps in addition to or instead the sub-steps listed above.

At step 340 the merge utility conversion engine interface 206 returns the conversion results to the merge utility conversion engine 204. At step 346, the merge utility conversion engine 204 merges the conversion results, by for example merging converted overlay input data 104b and converted background template input data 106b into a merge document, such as single document 101. According to an embodiment of the invention, the merge utility conversion engine 204 may produce a single merged document in a format supported by output devices 112, 114, and 250 (e.g., single file 101), and including the visual presentation properties of the original documents, as determined by the document authoring application that created the original background template document (background template document authoring application 208), and as determined by the overlay document authoring application 212 that created the original overlay document (overlay input data 104).

At step 348, the merge utility conversion engine 204 passes information concerning single document 101, as a SPIF output file, to server 202. At step 350, the merge utility conversion engine 204 passes single document 101 to an output device (e.g., output device 112, 114, or 250).

As described above, in an embodiment, a computer implemented method 300 combines multiple SPIF files into a single print document (single document 101) for printing and may facilitate customization and maintenance of customized reports. In an embodiment, merge utility 102 converts a overlay input data 104 into a SPIF document internally as well as reads another converted background template input data 106b, as a SPIF file, and generates single document 101 for printing. In an embodiment, merge utility 102 generates output for a variety of textual or other input coming from any program and can merge the generated output with a second background template document. In an embodiment, the passing of single document 101 to output device 112, 114, or 250 and the merging of the converted background template input data 106b with converted overlay input data 104b are executed at printing time.

Hardware Overview

The approach for generation of an electronic document described herein may be implemented in a variety of ways and the invention is not limited to any particular implementation. The approach may be integrated into a computing system or a printing device, or may be implemented as a stand-alone mechanism. Furthermore, the approach may be implemented in computer software, hardware, or a combination thereof.

Figure 4:
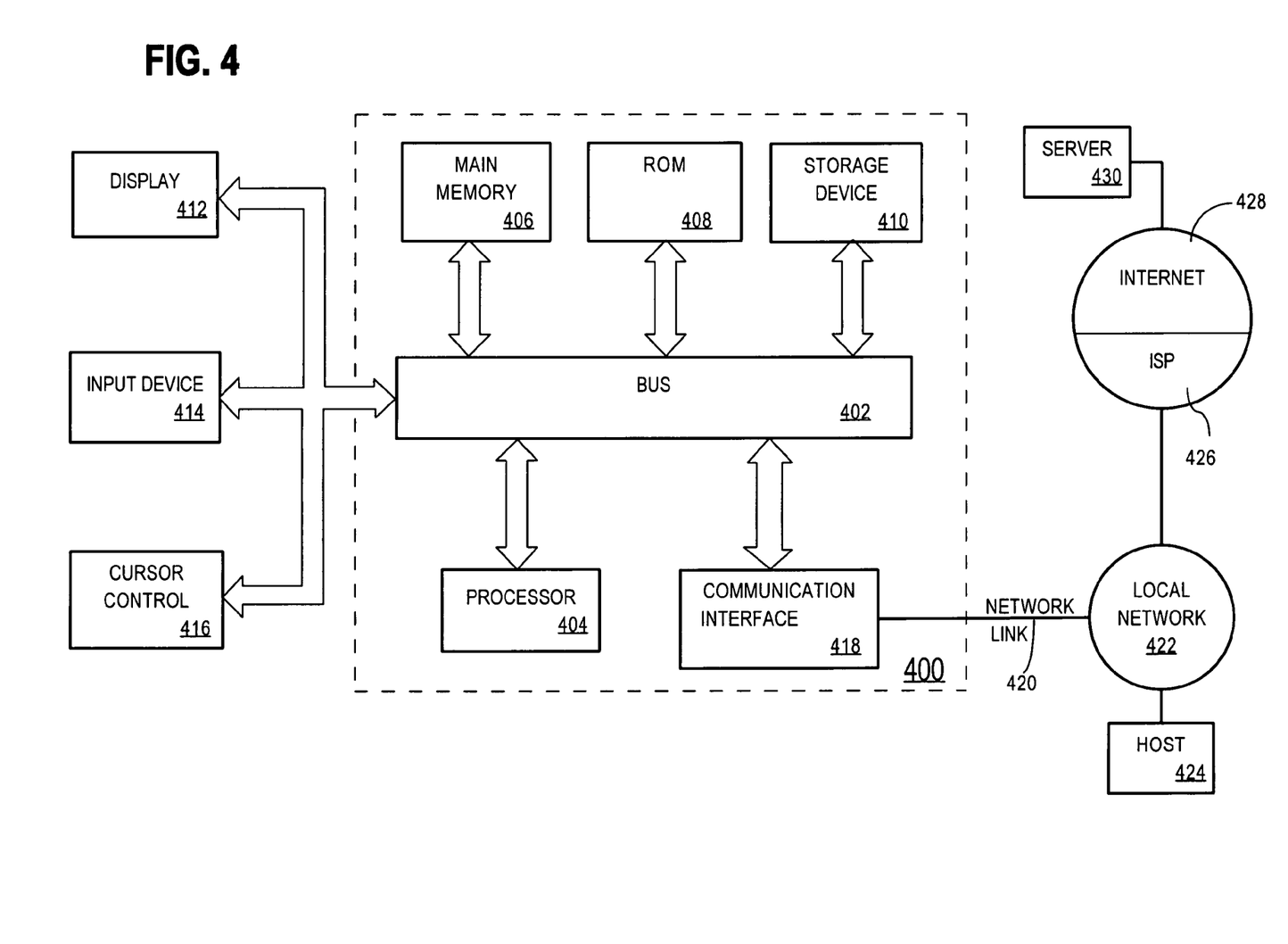
FIG. 4 is a block diagram that depicts a computer system upon which embodiments of the invention may be implemented.

FIG. 4 is a block diagram that depicts a computer system 400 upon which an embodiment of the invention may be implemented. Computer system 400 is an example of a computer system that may be used for computing device 108, computing device 110, and/or merge utility 102. Alternatively, merge utility may be a plurality of computer systems similar to computer system 400 connected together in a network. For example, server 202 may be one computer system 400 and merge utility conversion engine may be another computing system 400. Alternatively, computing device 108, computing device 110, merge utility 102, background template document authoring application 208, and/or overlay document authoring application 212 may be separate applications running on the same computer system 400.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, the method of merging documents (e.g., method 300), described above, are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution, and is an example of a machine-readable medium. The methods of merging documents described herein, such as method 300, may be carried (e.g., stored on) such computer-readable media. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. Network link 420 is an example of network connection 122. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 318. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method comprising:
receiving, at a merge utility executing on a computer system, a request to merge a first merge document in a merge format with a second document in an original format;
wherein the second document was created in said original format by a first document authoring application;
in response to the request, the merge utility causing the second document to be converted from the original format to the merge format to create a second merge document;
wherein the second merge document is in the merge format;
wherein the step of converting is performed by either the merge utility or the first document authoring application;
the merge utility merging the first merge document and the second merge document to generate a composite merge document; and
after generating the composite merge document, the merge utility causing said composite merge document to be delivered to an output device;
wherein the output device is a device that is different from the computer system;
wherein the original format is a format that is not supported by the output device, and therefore needs to be converted to another format that is supported by the output device in order to be properly interpreted by the output device; and
wherein the merge format is a format that is supported by the output device, and therefore does not need to be converted to another format that is supported by the output device in order to be properly interpreted by the output device;
wherein the method is performed by one or more computing devices.

2. The method of claim 1 further comprising:
generating the first merge document in said merge format by converting a first original document from an original format to the merge format.

3. The method of claim 1, wherein the merge format is Standard Printing and Imaging Format (SPIF).

4. The method of claim 3, wherein the merge format is PDL Postscript.

5. The method of claim 1, wherein the first document is a background template document and the second document is an overlay document.

6. The method of claim 5,
wherein the background template document is originally created by a second document authoring application; and
wherein the second document authoring application is different from said first document authoring application.

7. The method of claim 5, wherein the background template document is created in a second original format and converted from the second original format to the merge format.

8. The method of claim 1, wherein causing the second document to be converted from the original format to the merge format comprises the merge utility converting the second document to the merge format.

9. The method of claim 1, wherein causing the second document to be converted from the original format to the merge format to create the second merge document includes:
the merge utility generating, based on the original format, a set of conversion instructions to convert the second document into said second merge document;
passing the set of conversion instructions from the merge utility to the first document authoring application;
wherein the conversion instructions, when interpreted by the first document authoring application, cause the first document authoring application to generate the second merge document based on said set of conversion instructions.

10. The method of claim 1, wherein the request contains information about the first document authoring application, wherein causing the second document to be converted from the original format to the merge format to create the second merge document includes:
the merge utility generating, based on the information about the first document authoring application, a set of conversion instructions to convert the second document into said second merge document;
passing the set of conversion instructions from the merge utility to the first document authoring application; and
wherein the conversion instructions, when interpreted by the first document authoring application, cause the first document authoring application to generate the second merge document based on said set of conversion instructions.

11. The method of claim 1, wherein the composite merge document is in the merge format.

12. The method of claim 1, wherein the composite merge document is a template for creating other documents.

13. The method of claim 1,
wherein the steps of causing the second document to be converted and merging the first merge document and the second merge document are both performed in response to the merge utility receiving the request to merge documents.

14. The method of claim 1 further comprising:
generating the first merge document in said merge format by converting a first original document from an original format to the merge format;
wherein the merge format is Standard Printing and Imaging Format (SPIF);
wherein the first document is a background template document and the second document is an overlay document;
wherein the background template document is originally created by a second document authoring application; and
wherein the second document authoring application is different from said first document authoring application;
wherein the background template document is created in a second original format and converted from the second original format to the merge format.

15. A non-transitory machine-readable storage medium storing one or more sequences of instructions, which when executed by one or more processors, causes:
receiving, at a merge utility executing on a computer system, a request to merge a first merge document in a merge format with a second document in an original format;
wherein the second document was created in said original format by a first document authoring application;
in response to the request, the merge utility causing the second document to be converted from the original format to the merge format to create a second merge document;
wherein the second merge document is in the merge format;
wherein the step of converting is performed by either the merge utility or the first document authoring application;
the merge utility merging the first merge document and the second merge document to generate a composite merge document; and
after generating the composite merge document, the merge utility causing said composite merge document to be delivered to an output device;
wherein the output device is a device that is different from the computer system;
wherein the original format is a format that is not supported by the output device, and therefore needs to be converted to another format that is supported by the output device in order to be properly interpreted by the output device; and
wherein the merge format is a format that is supported by the output device, and therefore does not need to be converted to another format that is supported by the output device in order to be properly interpreted by the output device.

16. The non-transitory machine-readable storage medium of claim 15, wherein the one or more sequences of instructions, when executed by one or more processors, further causes:
generating the first merge document in said merge format by converting a first original document from an original format to the merge format.

17. The non-transitory machine-readable storage medium of claim 15 wherein the merge format is Standard Printing and Imaging Format (SPIF).

18. The non-transitory machine-readable storage medium of claim 17 wherein the merge format is PDL Postscript.

19. The non-transitory machine-readable storage medium of claim 15 wherein the first document is a background template document and the second document is an overlay document.

20. The non-transitory machine-readable storage medium of claim 19,
wherein the background template document is originally created by a second document authoring application; and
wherein the second document authoring application is different from said first document authoring application.

21. The non-transitory machine-readable storage medium of claim 19 wherein the background template document is created in a second original format and converted from the second original format to the merge format.

22. The non-transitory machine-readable storage medium of claim 15 wherein causing the second document to be converted from the original format to the merge format comprises the merge utility converting the second document to the merge format.

23. The non-transitory machine-readable storage medium of claim 15 wherein causing the second document to be converted from the original format to the merge format to create the second merge document includes:
the merge utility generating, based on the original format, a set of conversion instructions to convert the second document into said second merge document;
passing the set of conversion instructions from the merge utility to the first document authoring application;
wherein the conversion instructions, when interpreted by the first document authoring application, cause the first document authoring application to generate the second merge document based on said set of conversion instructions.

24. The non-transitory machine-readable storage medium of claim 15 wherein the request contains information about the first document authoring application, wherein causing the second document to be converted from the original format to the merge format to create the second merge document includes:
the merge utility generating, based on the information about the first document authoring application, a set of conversion instructions to convert the second document into said second merge document;
passing the set of conversion instructions from the merge utility to the first document authoring application; and
wherein the conversion instructions, when interpreted by the first document authoring application, cause the first document authoring application to generate the second merge document based on said set of conversion instructions.

25. The non-transitory machine-readable storage medium of claim 15 wherein the composite merge document is in the merge format.

26. The non-transitory machine-readable storage medium of claim 15 wherein the composite merge document is a template for creating other documents.

27. The non-transitory machine-readable storage medium of claim 15
wherein the steps of causing the second document to be converted and merging the first merge document and the second merge document are both performed in response to the merge utility receiving the request to merge documents.

28. The non-transitory machine-readable storage medium of claim 15 wherein the one or more sequences of instructions, when executed by one or more processors, further causes:
   generating the first merge document in said merge format by converting a first original document from an original format to the merge format;
   wherein the merge format is Standard Printing and Imaging Format (SPIF);
   wherein the first document is a background template document and the second document is an overlay document;
   wherein the background template document is originally created by a second document authoring application; and
   wherein the second document authoring application is different from said first document authoring application;
   wherein the background template document is created in a second original format and converted from the second original format to the merge format.

29. The method of claim 1, wherein the first merge document is a version of a first document that has been converted from an original format to the merge format.

30. The non-transitory machine-readable storage medium of claim 15 wherein the first merge document is a version of a first document that has been converted from an original format to the merge format.

* * * * *

UNITED STATES PATENT AND TRADEMARK OFFICE
CERTIFICATE OF CORRECTION

PATENT NO.        : 8,582,164 B2
APPLICATION NO.   : 10/733102
DATED             : November 12, 2013
INVENTOR(S)       : Elkady et al.

It is certified that error appears in the above-identified patent and that said Letters Patent is hereby corrected as shown below:

In the Specification

In column 4, line 65, delete "their," and insert -- there, --, therefor.

Signed and Sealed this
Third Day of June, 2014

Michelle K. Lee
*Deputy Director of the United States Patent and Trademark Office*